US012099930B2

(12) United States Patent
Mathew et al.

(10) Patent No.: US 12,099,930 B2
(45) Date of Patent: Sep. 24, 2024

(54) PARAMETRIC POWER-OF-2 CLIPPING ACTIVATIONS FOR QUANTIZATION FOR CONVOLUTIONAL NEURAL NETWORKS

(71) Applicant: Texas Instruments Incorporated, Dallas, TX (US)

(72) Inventors: Manu Mathew, Bangalore (IN); Kumar Desappan, Bangalore (IN); Soyeb Noormohammed Nagori, Bangalore (IN); Debapriya Maji, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 851 days.

(21) Appl. No.: 17/117,271

(22) Filed: Dec. 10, 2020

(65) Prior Publication Data

US 2021/0224658 A1    Jul. 22, 2021

(30) Foreign Application Priority Data

Dec. 12, 2019   (IN) .............................. 201941051538

(51) Int. Cl.
   *G06N 3/048*   (2023.01)
   *G06N 3/04*    (2023.01)
   *G06N 3/084*   (2023.01)
(52) U.S. Cl.
   CPC .............. *G06N 3/084* (2013.01); *G06N 3/04* (2013.01); *G06N 3/048* (2023.01)

(58) Field of Classification Search
   CPC .......... G06N 3/084; G06N 3/04; G06N 3/045; G06N 3/048
   See application file for complete search history.

(56) References Cited

U.S. PATENT DOCUMENTS

| | | | |
|---|---|---|---|
| 11,521,047 B1* | 12/2022 | Reda ....................... G06N 3/084 |
| 2019/0012559 A1* | 1/2019 | Desappan ............ G06V 10/764 |
| 2020/0364545 A1* | 11/2020 | Shattil ...................... G06N 3/08 |
| 2021/0034955 A1* | 2/2021 | Sather .................... G06N 5/046 |

(Continued)

OTHER PUBLICATIONS

TDA4VM Jacinto Automotive Processors for ADAS and Autonomous Vehicles Silicon Revision 1.0, SPRSP36E, Texas Instruments, Inc., Feb. 2019, Revised Dec. 2019, pp. 1-311.

(Continued)

*Primary Examiner* — Beau D Spratt
(74) *Attorney, Agent, or Firm* — Michael T. Gabrik; Frank D. Cimino

(57) ABSTRACT

In described examples of a method for quantizing data for a convolutional neural network (CNN) is provided. A set of data is received and quantized the using a power-of-2 parametric activation (PACT2) function. The PACT2 function arranges the set of data as a histogram and discards a portion of the data corresponding to a tail of the histogram to form a remaining set of data. A clipping value is determined by expanding the remaining set of data to a nearest power of two value. The set of data is then quantized using the clipping value. With PACT2, a model can be quantized either using post training quantization or using quantization aware training. PACT2 helps a quantized model to achieve close accuracy compared to the corresponding floating-point model.

20 Claims, 5 Drawing Sheets

(56) References Cited

U.S. PATENT DOCUMENTS

| | | | |
|---|---|---|---|
| 2021/0103799 A1* | 4/2021 | Venkataramani | G06N 3/063 |
| 2021/0110260 A1* | 4/2021 | Yoshiyama | G06N 3/08 |
| 2021/0182077 A1* | 6/2021 | Chen | G06Q 30/0241 |

OTHER PUBLICATIONS

Rectifier (neural networks), Wikipedia, available at https://en.wikipedia.org/wiki/Rectifier_(neural_networks) on Nov. 18, 2020, pp. 1-4.

Udeme Udofia, "Basic Overview of Convolutional Neural Network (CNN)", available at https://mediium.com/dataseries/basic-overview-of-convolutional-neural-network-cnn-fcc7dbb4f17 on Dec. 3, 2020, pp. 1-6.

Andreas Geiger, Philip Lenz, and Raquel Urtasun, "Are we ready for Autonomous Driving? The KITTI Vision Benchmark Suite", 2012 IEEE Conference on Computer Vision and Pattern Recognition, Providence, RI, 2012, pp. 3354-3361.

Marius Cordts et al, "The Cityscapes Dataset for semantic Urban Scene Understanding", Computer Science—Computer Vision and Pattern Recognition, eprint arXiv:1604.01685, Apr. 6, 2016, pp. 1-29.

Kaiming He et al, "Deep Residual Learning for Image Recognition", Cornell University, Computer Science—Computer Vision and Pattern Recognition, eprint arXiv:1512.03385, Dec. 10, 2015, pp. 1-12.

Shaoqing Ren et al, "Faster R-CNN: Towards Real-Time Object Detection with Region Proposal Networks", Cornell University, Computer Science—Computer Vision and Pattern Recognition, eprint arXiv:1506.01497, submitted Jun. 4, 2015, last revision Jan. 6, 2016, pp. 1-14.

Jia Deng et al, "ImageNet: A Large-scale hierarchical image database", 2009 IEEE Conference on Computer Vision and Pattern Recognition, Miami, FL, 2009, pp. 248-255.

Olga Russakovsky et al, "ImageNet Large Scale Visual Recognition Challenge", Cornell University, Computer Science—Computer Vision and Pattern Recognition, eprint arXiv:1409.0575, submitted Sep. 1, 2014, last revision Jan. 30, 2015.

Alex Krizhevsky, Ilya Sutskever, and Geoffrey E. Hinton, "ImageNet Classification with Deep Convolutional Neural Networks", Advances in Neural Information Processing Systems, Jan. 2012, pp. 1-12.

Karen Simonyan and Andrew Zisserman, "Very Deep Convolutional Networks for Large-Scale Image Recognition", Cornell University, Computer Science—Computer Vision and Pattern Recognition, eprint arXiv:1409.1556, submitted Sep. 4, 2014, last revised Apr. 10, 2015, pp. 1-14.

Song Han, Juizi Mao, William J. Dally, "Deep Compression: Compressing Deep Neural Networks with Pruning, Trained Quantization and Huffman Coding", Cornell University, Computer Science—Computer Vision and Pattern Recognition, eprint arXiv:1510.00149, submitted Oct. 1, 2015, last revised Feb. 15, 2016, pp. 1-14.

Andrew G. Howard et al, "MobileNets: Efficient Convolutional Neural Networks for Mobile Vision Applications", Cornell University, Computer Science—Computer Vision and Pattern Recognition, eprint arXiv:1704.04861, Apr. 17, 2017, pp. 1-9.

Mark Sandler et al, "MobileNetV2: Inverted Residuals and Linear Bottlenecks", Cornell University, Computer Science—Computer Vision and Pattern Recognition, eprint arXiv:1801,04381, submitted Jan. 13, 2018, last revised Mar. 21, 2019, pp. 1-14.

Benoit Jacob et al, "Quantization and Training of Neural Networks for Efficient Integer-Arithmetic-Only Inference", Cornell Universtiy, Computer Science—Computer Vision and Pattern Recognition, eprint arXiv:1712.05877, Dec. 15, 2017, pp. 1-14.

Raghuraman Krishnamoorthi, "Quantizing deep convolutional networks for efficient inference: A whitepaper", Cornell University, Computer Science—Machine Learning, eprint arXiv:1806.08342, Jun. 21, 2018, pp. 1-36.

Jungwook Choi et al, "PACT: Parameterized Clipping Activation for Quantized Neural Networks", Cornell University, Computer Science—Computer Vision and Pattern Recognition, eprint arXiv:1805.06085, submitted May 16, 2018, last revised Jul. 17, 2018, pp. 1-15.

Yoshua Bengio, Nicholas Leonard, and Aaron Courville, Estimating or Propagating Gradients Through Stochastic Neurons for Conditional Computation, Cornell University, Computer Science—Machine Learning, eprint arXi:1308.3432, Aug. 15, 2013, pp. 1-12.

Penghang Yin et al, Understanding Straight-Through Estimator in Training Activation Quantized Neural Nets, Cornell University, Computer Science—Machine Learning, International Conference on Learning Representations (ICLR) 2019, eprint arXiv:1903.05662, submitted Mar. 13, 2019, last revised Sep. 25, 2019, pp. 1-30.

Sambhav R. Jain et al, "Trained Quantization Thresholds for Accurate and Efficient Fixed-Point Inference of Deep Neural Networks", Cornell University, Computer Science—Computer Vision and Pattern Recognition, Proceedings of the 3rd Machine Learning Systems (MLSys) Conference, Austin, TX 2020, eprint arXiv:1903.08066, submitted Mar. 19, 2019, last revised Feb. 28, 2020, pp. 1-17.

Ron Banner et al, "Post-training 4-bit quantization of convolution networks for rapid-deployment", Cornell University, Computer Science—Computer Vision and Pattern Recognition, eprint arXiv:1810.05723, submitted Oct. 2, 2018, last revised May 29, 2019, pp. 1-16.

Alexander Finkelstein, Uri Almog, and Mark Grobman, "Fighting Quantization Bias With Bias", Cornell University, Computer Science—Machine Learning, eprint arXiv: 1906.03193, Jun. 7, 2019, pp. 1-9.

Markus Nagel et al, "Data-Free Quantization Through Weight Equalization and Bias Correction", Cornell University, Computer Science—Machine Learning, eprint arXiv:1906.04721submitted Jun. 11, 2019, last revised Nov. 25, 2019, pp. 1-13.

Liang-Chieh Chen et al, "Encoder-Decoder with Atrous Separable Convolution for Semantic Image Segmentation", Cornell University, Computer Science—Computer Vision and Pattern Recognition, eprint arXiv:1802.02611, submitted Feb. 7, 2018, last revised Aug. 22, 2018, pp. 1-18.

Martin Abadi et al, "TensorFlow: Large-Scale Machine Learning on Heterogeneous Distributed Systems", Cornell University, Computer Science—Distributed, Parallel, and Cluster Computing, eprint arXiv:1603.04467, sumitted Mar. 14, 2016, last revised Mar. 16, 2016, pp. 1-19.

Martin Abadi et al, "TensorFlow: A system for large-scale machine learning", Cornell University, Computer Science—Distributed, Parallel, and Cluster Computing, eprint arXiv:1605.08695, submitted May 27, 2016, last revised May 31, 2016, pp. 1-18.

Adam Paszke et al, "Automatic differentiation in PyTorch", 31st Conference on Neural Information Processing Systems (NIPS 2017) Long Beach, CA, Oct. 28, 2017, pp. 1-4.

"Post-training quantization", TensorFlow, available at https://www.tensorflow.ort/lite/performance/post_training_quantization on Dec. 5, 2020, pp. 1-2.

"TensorFlow Lite 8-bit quantization specification", TensorFlow, available at https://www.tensorflow.org/lite/performance/quantization_spec on Dec. 5, 2020, pp. 1-2.

* cited by examiner

PARAMETRIC POWER-OF-2 CLIPPING ACTIVATIONS FOR QUANTIZATION FOR CONVOLUTIONAL NEURAL NETWORKS

CROSS-REFERENCE TO RELATED APPLICATION

This application claims priority to India Provisional Patent Application No. 201941051538 filed Dec. 12, 2019, the entirety of which is incorporated herein by reference.

TECHNICAL FIELD

This relates to parametric power-of-2 clipping activation functions for quantification of data elements for neural networks.

BACKGROUND

Deep learning with convolutional neural networks (CNNs) has revolutionized the field of computer vision. CNNs are being applied to diverse scenarios such as driver assistance and autonomous driving [1][2], medicine, cloud computing and even on mobile devices. The field of deep learning is propelled by the availability of compute resources, availability of huge amount of data and improved training methods.

Ability of graphics processing units (GPUs) to efficiently handle deep learning workloads has enabled training of deep networks on desktop computers. Availability of huge annotated datasets such as the ImageNet[3] ILSVRC[4], KITTI[1] and Cityscapes[2] have helped to improve the learning of very deep networks.

SUMMARY

In described examples of a method for quantizing data for a convolutional neural network (CNN) is provided. A set of data is received and quantized the using a power-of-2 parametric activation (PACT2) function. The PACT2 function arranges the set of data as a histogram and discards a portion of the data corresponding to a tail of the histogram data to form a remaining set of data. A clipping value is determined by expanding the remaining set of data to a nearest power of two value. The set of data is then quantized using the clipping value. With PACT2, a model can be quantized either using post training quantization or using quantization aware training. PACT2 helps a quantized model to achieve close accuracy compared to the corresponding floating-point model. The resulting model can be exported to a model format with clip values/layers and these clip values/layers can be used to derive quantization information required for inference.

DETAILED DESCRIPTION

Figure 1:
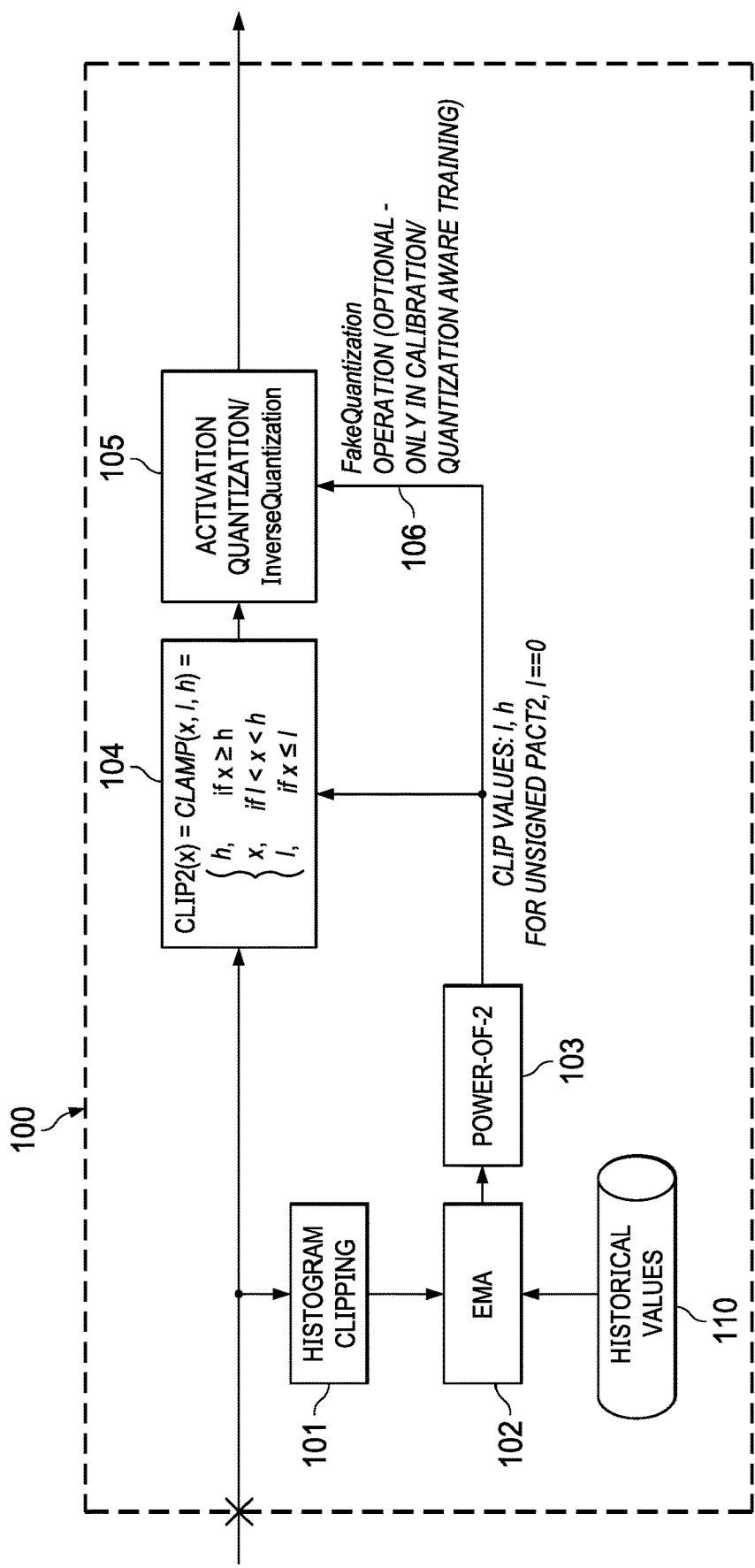
FIG. 1 is a flow diagram of operation of an example PACT2 activation function.

In the drawings, like elements are denoted by like reference numerals for consistency.

Deep learning inference on low power embedded devices typically requires inference of convolutional neural networks (CNNs) using fixed point operations. 8-bit quantization for CNNs is important because several system on chip (SoC) integrated circuits have included specialized accelerators for maximizing the throughput for 8-bit CNN operations. The simplest form of 8-bit quantization, i.e. symmetric, power-of-2 with per-layer quantization for both weights and activations, has the least cost of implementation on embedded hardware. 8-bit fixed point inference under these constraints without significant loss of accuracy (compared to floating point inference) is a challenging problem. This is especially true for small networks such as MobileNets that use Depthwise Convolution layers. Convolutional neural networks (CNNs) are heavily being used for artificial intelligence tasks in various domains including advanced driver assistance system (ADAS).

In a typical example, an image is obtained, such as by a camera or radar, as pixels and it is expressed as a matrix (N×N×3)—(height by width by channels). Example images make use of three channels (RGB), which is a depth of three. The convolutional layer makes use of a set of learnable filters. A filter is used to detect the presence of specific features or patterns present in the original image (input). It is usually expressed as a matrix (M×M×3), with a smaller dimension but the same number of channels as the input file. This filter is convolved (slid) across the width and height of the input file, and a dot product is computed to give an activation map. Different filters which detect different features are convolved on the input file and a set of activation maps is output which is passed to the next layer in the CNN. The activation function is a node that is put at the end of or in between neural networks. They help to decide if the neuron would fire or not.

Often CNNs need to be implemented using 8-bit operations in embedded processors (for example: in Jacinto 7 TDA4x processors available from Texas Instruments). In such low power embedded processors, there are often severe constraints on the type of quantization operations that are supported at highest throughput; for example, symmetric, power-of-2, per-layer quantization.

The quantization involved in this conversion from floating point to constrained fixed point introduces significant accuracy loss. The primary reasons for this are the unconstrained ranges of weights and activations of CNNs. Quantization performs poorly when the ranges of the quantities that we are quantizing are not suitable for quantization.

The rectifier is a popular activation function for deep neural networks. A unit employing the rectifier is also called a rectified linear unit (ReLU). Rectified linear units find applications in computer vision and speech recognition using deep neural nets and computational neuroscience. The rectified linear activation function is a piecewise linear function that will output the input directly if it is positive, otherwise, it will output zero. The rectified linear activation function overcomes the vanishing gradient problem, allowing models to learn faster and perform better. In the context of artificial neural networks, the rectifier is an activation function defined as the positive part of its argument: where x is the input to a neuron. This is also known as a ramp function and is analogous to half-wave rectification in electrical engineering.

ReLU activation functions (or ReLU6, where the maximum output is limited to six) have been used to constrain the activations to a fixed quantity. However, this is not effective and not sufficient to produce good accuracy with quantization.

Parametric ACTivations (PACT) has been used to train the activation ranges in a constrained way; however, these are not suitable for power-of-2 quantization. If training of a model using PACT functions under the constraints of power-of-2 is attempted, it generates unstable and poor accuracy.

A technique for quantizing floating point CNN models to 8-bit fixed point described herein is referred to as "power-of-2 parametric activations" (PACT2). PACT2 can be inserted in a CNN model at places where the activation range needs to be constrained. PACT2 can either be used for post training quantization (also known as quantization with calibration or just calibration) or for quantization aware training. A model calibrated or trained with PACT2 has all the information for it to be quantized and no additional quantization parameters need to be inserted in the model for common networks being considered. A PACT2 based post training quantization method can provide good accuracy in several scenarios. In rare scenarios, where it produces lower than desired accuracy, a PACT2 based quantization aware training can be used to close the accuracy gap compared to floating point inference.

Deep learning is increasingly being deployed on low power embedded devices and may be referred to as "deep learning at the edge" or "edge computing." Edge computing means that artificial intelligence (AI) algorithms are processed locally on a hardware device (which often consumes low amount of power—low power devices). The algorithms can use data (sensor data or signals) that are created on the device. A device using edge computing does not need to be connected to the cloud to work properly; it can process data and take decisions independently to avoid latency and privacy considerations. Often such inference is done with 8-bit fixed point operations. Thus, being able to do CNN Inference with 8-bit fixed point operations is of importance for deep learning on the edge.

The first step in fixed-point inference is to convert a floating-point trained model to fixed point. If this conversion is not done carefully, the output accuracy will degrade significantly, making the model unusable. The earlier methods of converting a floating-point model to fixed point involved training with quantization, thereby learning weights that are suitable in the quantized domain. This kind of quantization is called "quantization aware training," which is also referred to as "trained quantization." However, it is highly desirable to be able to take a floating-point model and be able to use it for inference in a fixed-point device, without going through an extensive quantization aware training process. Such a method of quantization is called "post training quantization." Post training quantization is a challenging problem and earlier methods were not quite successful in achieving good accuracy with that. Recently, newer and improved methods have evolved that requires various kinds of calibration operations.

A simple form of 8-bit quantization uses symmetric, power-of-2, per-layer quantization. "Symmetric" means that if the data to be quantized to 8-bit is signed, a quantized range of −128 to +127 will be assigned to it by scaling the data (no offsets are applied to adjust the un-evenness between positive and negative side). If the data to be quantized is un-signed, it will be quantized between 0 and 255. "Power-of-2" quantization means that such scaling is always a power-of-2 number, so that conversion from one scale to another can be done purely by shifts. "Per-layer" (or per-tensor) refers to the use of a common scale factor for quantization of one layer (for example, one convolution layer). Being able to quantize with symmetric, power-of-2 and per-layer quantization is of great value because the cost of implementing such an inference in embedded hardware is lower compared to other forms of quantization. Unless otherwise mentioned, this type of quantization will be described herein. In some examples, enabling per-channel instead of per-layer quantization can improve the quantization accuracy in some cases.

In described examples, parametric activation functions with power-of-2 ranges (PACT2) is used to clip the activation feature map ranges. This PACT2 function estimates the range of incoming activations and clips them to a suitable power-of-2 number in a way that the clipping does not introduce too much degradation. Two variants of PACT2, signed or unsigned, can be used depending on the sign of output. Unsigned PACT2 is inserted in the place of ReLU (or ReLU6, where the maximum output is limited to 6) activation functions. Signed activation functions are inserted when there is no ReLU/ReLU6 and the activation feature map needs to be clipped. This situation often happens in certain networks such as MobileNetV2, where there is no ReLU after Convolution and Batch Normalization in some cases.

Inserting the PACT2 function serves two purposes. First, it clips the activation feature map so that it is contained within a certain range. Second, the PACT2 clip function becomes part of the model graph (for example, the ONNX model; ONNX is an open format for machine learning (ML) models, allowing models to be interchanged between various ML frameworks and tools) and it is easy for the inference engine to understand what the clipping range is. Once these clipping values are known, the quantization scale factors can be derived easily.

In described examples, PACT2 allows fast methods to do both post training quantization as well as trained quantization for inference using 8-bit fixed point operations.

FIG. 1 is a flow diagram of operation of an example PACT2 activation function 100. When the feature map range is too large quantization accuracy suffers. Oftentimes the feature map has a long-tailed distribution, with only few values occupying large values. These large values do not contribute to the accuracy of the model because they are so few in number but do affect the accuracy in quantized inference if the range used for quantization includes them. Therefore, it is beneficial to forcefully clip the activation range within reasonable limits without degrading the overall accuracy.

Depending on the sign of the feature map, two example variants of PACT2 are described herein: expression (1) is for unsigned PACT2u, while expression (2) is for signed PACT2s.

$$y=PACT_u(x)=\text{clamp}(x,0,\infty_a) \quad (1)$$

$$y=PACT_s(x)=\text{clamp}(x,-\infty_a,\infty_a) \quad (2)$$

Where $\infty_a$ is the clipping value and the clamp operation is defined by expression (3). "l" represents low clipping value $-\infty_a$ and "h" represents high clipping value $\infty_a$.

$$\text{clamp}(x, l, h) = \begin{cases} h, & \text{if } x \geq h \\ x, & \text{if } l < x < h \\ l, & \text{if } x \leq l \end{cases} \quad (3)$$

PACT2u is a replacement for ReLU activation function due to the unsigned nature of activations. There may be several places in a model where the activations need to be quantized, but there is no ReLU at that place. For example, this happens in the linear bottleneck of the MobileNetV2 models where the convolution+batch normalization has no ReLU following it. This also happens in the ResNet models before the element-wise addition of the residual block. PACT2s can be inserted in the model in those places. Essentially, a PACT2s may be inserted in a model wherever there is a need to quantize the feature map and the feature map is signed. Collectively, the signed and unsigned versions are referred to as "PACT2" herein.

One important question is how to select a suitable clipping parameter $\propto_a$ such that the feature map range is contained and is suitable for quantization, but without clipping too much so as not to cause accuracy degradation. This selection can be done via a learning process with gradient descent that may be used with the PACT function, see, e.g.: PACT[5]. The downside is that the learning is slow, sensitive and affects the accuracy of the model significantly. Also, since PACT2 introduces a constraint of power-of-2 ranges, the sudden transitions introduced due to the switch from one power-of-2 value to another can make the learning process unstable.

However, it is possible to statistically estimate these clipping values. At 101, a set of data elements is received, such as a matrix of data that represents one layer of a portion of an image. A histogram is used to discard 0.01 percentile (1e-4 in fraction) from the tail(s) of the feature map distribution to estimate the maximum value. PACTu has only one tail and PACTs has two tails. At 102, exponential moving average (EMA) is used to smooth the maximum value over several batches using historical values 110 to find a smoothed maximum value of the distribution. At 103, this smoothed value is then expanded to the next power-of-2 to find a clipping value $\propto_a$. In PACTs a single common value is used as the magnitude of cc since symmetric quantization is being used. Thus, in PACTs, the maximum of the magnitude of both sides is used as $\propto_a$.

At 104, clipping is performed as defined by expression (3) using the clipping values l, h determined at 103.

At 105, activation quantization is performed, as described in more detail below. In post training quantization as well as in quantization aware training, a histogram and EMA is used to estimate a suitable value of $\propto_a$. This method is fast, stable and it does not need back-propagation. This is especially desirable in calibration for post training quantization, as post training quantization does not use back-propagation.

Basic Quantization Scheme

During calibration, the clipping thresholds for activations is estimated, as well as weights and biases for convolution and inner product layers. These clipping thresholds are herein referred to as "$\propto_a$, $\propto_w$," and "$\propto_b$" for the activations, weights and biases respectively. These values are computed separately for each layer. Histogram based range shrinking is done only for activations and it is not done for weights and biases. For weights and biases, simply find the absolute maximum value and expand it to the next power of 2 to form the clipping threshold.

Sometimes the merged weights of a layer have too large a range and are not suitable for quantization. In that case, calibration cannot solve a resulting accuracy issue. This case is detected at 217, see FIG. 2, by comparing the maximum value of weights in a layer to the median value of weights in that layer. These weights are then clipped based on a new max value derived from the median value, so that the weights have limited range and are suitable for quantization. This is referred to herein as "adaptive weight constraining" (AWC).

Once these thresholds are obtained, scaling factors can be determined, given the bit-width used for quantization as shown is expressions (4)-(6). Let "Sa," "Sw," and "Sb" denote the scale factor for activations, weights, and biases, respectively. Let "$b_w$" denote the bit-width used for quantization (for example 8 for 8-bit quantization).

$$S_a(x) = \begin{cases} \dfrac{2^{(b_w)}}{\propto_a} \text{ for } PACT_u \\ \dfrac{2^{(b_w-1)}}{\propto_a} \text{ for } PACT_s \end{cases} \quad (4)$$

$$S_w(x) = \dfrac{2^{(b_w-1)}}{\propto_w} \quad (5)$$

$$S_b(x) = \dfrac{2^{(b_w-1)}}{\propto_b} \quad (6)$$

Given these values, the quantization operation is done as shown in expressions (7)-(9)

$$Q_a(x) = \begin{cases} \text{clamp}(\lfloor S_a x \rfloor, 0, 2^{(b_w)}) \text{ for } PACT_u \\ \text{clamp}(\lfloor S_a x \rfloor, n, p) \text{ for } PACT_s \end{cases} \quad (7)$$

Where n=$-2^{(b_w-1)}$ and p=$2^{(b_w-1)}-1$ and $\lfloor \cdot \rfloor$ denotes rounding operation.

At 106, FakeQuantization operations simulate the discretization introduced by quantization by quantizing and then de-quantizing. These operations are especially useful for simulating the effect of quantization in calibration and training and may be used extensively. The FakeQuantized outputs can be written as shown by expressions (10)-(12)

$$\hat{x} = Q_a(X)/S_a \quad (10)$$

$$\hat{w} = Q_w(w)/S_w \quad (11)$$

$$\hat{b} = Q_b(b)/S_b \quad (12)$$

Clipping values of weights and biases are directly obtained from the weights and biases themselves. Given these definitions, the only information that needs to be conveyed to the inference engine that does quantized inference is the clipping values $\propto_a$ of the activations. These clipping values can be directly indicated in the network model as a clip operation on the activations and such a model is referred to as the calibrated model. Thus, to convey quantization information in the model, it is sufficient to insert PACT2 operations in the model wherever the activations need to be constrained. It is recommended to replace all ReLU operations in the model with PACT2. It is also recommended to insert PACT2s (signed version) even if there is no ReLU after convolution and batch normalization layers. PACT2 can also be inserted after element-wise additions and concatenations.

Post Training Quantization

Post training quantization (PTQ) involves two stages: (1) post training calibration in short, calibration or adjustment of the model; (2) quantized inference. The aim of the calibration stage is to select parameters that produce high accuracy in quantized inference.

In stage (1), calibration of the clipping values is performed. These are the clipping values used in the PACT2 operations and are thus estimated using histogram clipping and EMA as explained earlier. In described examples, it is possible to get reasonably good clipping values for the PACT2 operations in about 100 iterations, which is quite fast. Table 1 shows example quantization results for three different ImageNet classification models. Table 2 shows example quantization results for a Semantic Segmentation model.

Calibration of Model Parameters

Figure 2:
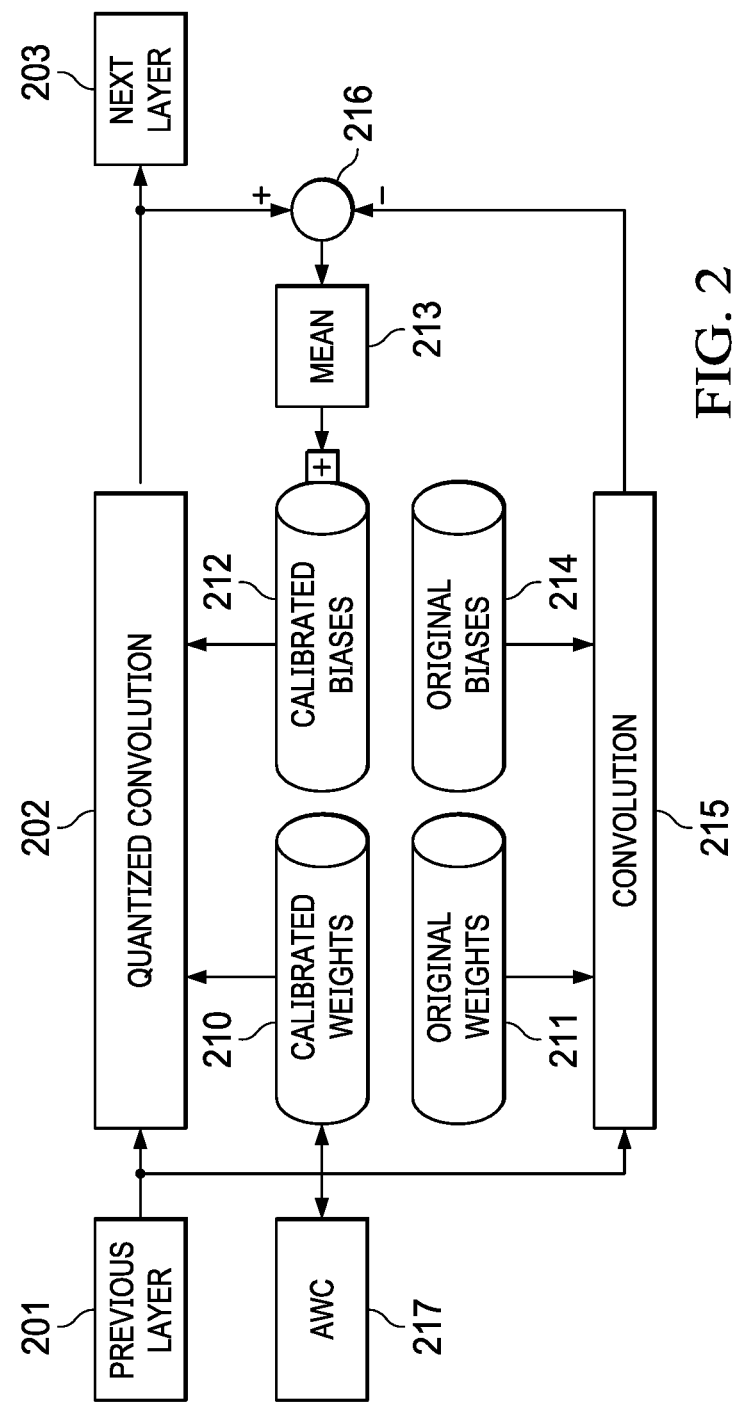
FIG. 2 is a flow diagram of an example of bias calibration for a convolution layer.

FIG. 2 is a flow diagram of an example of bias calibration for a convolution layer using post training quantization with calibration. This can be done for all layers with bias parameters, not only convolution. In this example, a previous layer 201, a current layer 202, and a next layer 203 are represented.

An example inference model is modified by replacing activations, such as ReLU, with PACT2 (unsigned) activations. PACT2 (signed) activations are also inserted in other places where activations need to be constrained. For example, convolution, BatchNormalization layers that do not have a ReLU after them, after element-wise addition, concatenation layers, etc.

Sometimes the merged weights of a layer have too large a range and are not suitable for quantization. In that case, calibration cannot solve a resulting accuracy issue. This case is detected at 217 by comparing the maximum value of weights in a layer to the median value of weights in that layer. These weights are then clipped based on a new max value derived from the median value, so that the weights have limited range and are suitable for quantization. This is referred to herein as adaptive weight constraining (AWC). One way of deriving the new max value is to use a multiple of the median value and one way of constraining is to do clipping using the new max value. So, one specific variant of adaptive weight constraining can be called "adaptive weight clipping."

It is possible to recover some of the accuracy lost during quantization by adjusting the bias parameters [9][10][11]. The aim of this method is to match the mean output of the floating-point model to that of the mean output of the quantized model. Thus, the bias calibration stage involves running the float (un-modified) model at 215 using original weights 211 and biases 214 and the quantized model at 202 using calibrated weights 210 and calibrated biases 212 in parallel. The weights and biases of the quantized model can then be adjusted for several batches of input images (iterations) so that the quantized model's output becomes closer to the floating-point model's output. A target threshold difference value may be selected to determine when a sufficient number of iterations have been performed.

Weight clipping and quantization introduces DC (flat) errors as well as AC (higher harmonics) errors in activations. Out of these, the DC errors can be corrected by using a bias adjustment technique during forward iterations. At 216, the mean difference is estimated between the activations for layers having a bias parameter. At 213, the bias parameter is changed based on the mean difference in activation values. It is important to change the bias parameter slowly in iterations (using a factor to scale down the mean difference) and after several iterations the process converges to provide a bias calibrated model. In addition, it may also be necessary to modify the weight parameters 210 in such a way that it is suitable for quantization.

The parameters of the model can be adjusted by comparing the floating-point output and fixed-point output at layer level. In this case, weights of the model can be adjusted at the layer level during forward iterations by looking at the ratio of standard deviation of the floating-point output and the fixed-point output. A threshold value may be selected to determine when the ratio is close enough to one so that additional adjustment is not needed.

The calibrated model can be exported as an ONNX graph, for example. PACT2 introduces CLIP values for the activation to be clipped. If PACT2 is inserted in all places where activation need to be constrained, then no further information needs to be provided in the ONNX model to quantize the model with high accuracy.

Experiments have shown the quantized calibration stage in post training quantization is able to find parameters that are suitable for quantized inference in most cases. However, there are rare cases where the accuracy degradation is more than expected. In these cases, quantization aware training can be used to overcome the accuracy gap.

Quantization Aware Training

Figure 3:
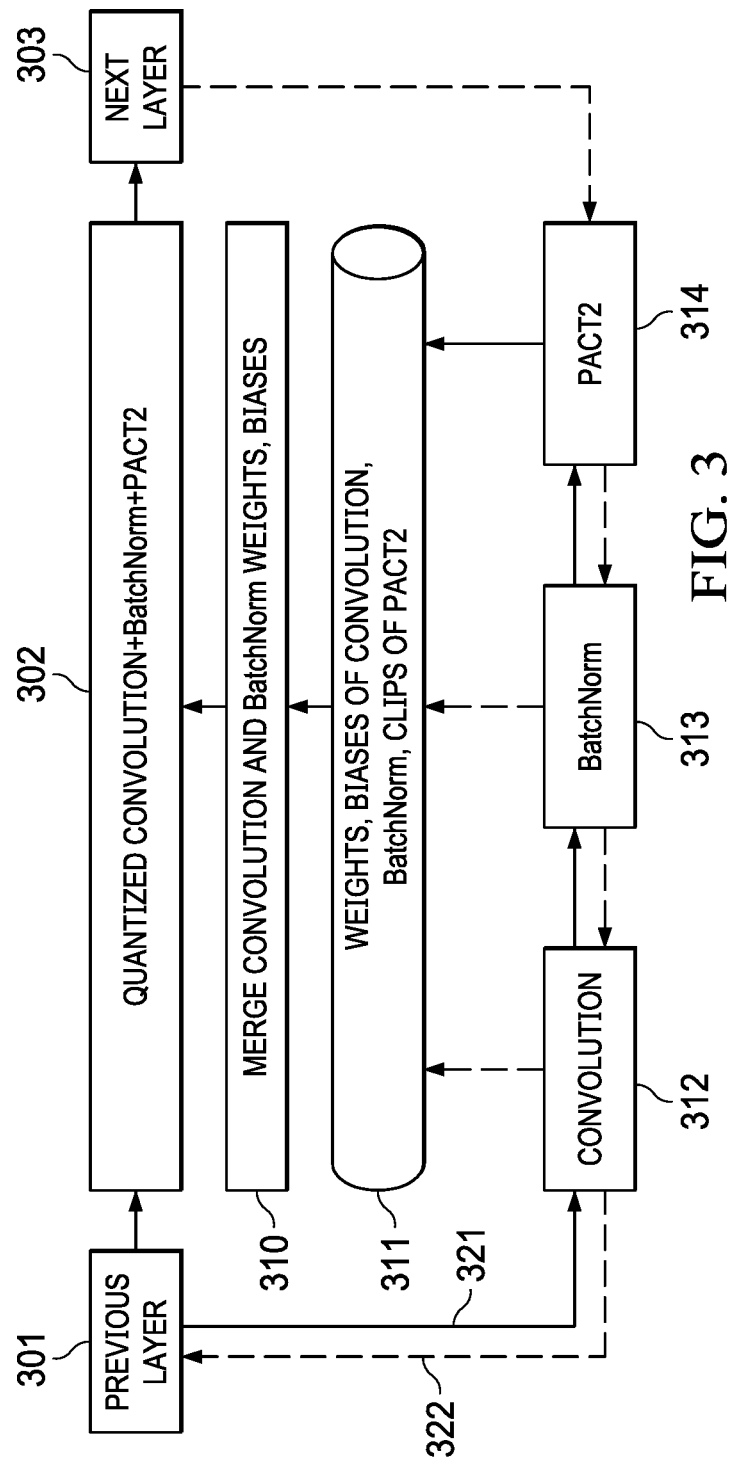
FIG. 3 is a block diagram of an example quantization aware training session with PACT2 and STE.

FIG. 3 is a block diagram of an example quantization aware training (QAT) session with PACT2 and straight through estimation (STE). In this example of STE implementation, only the quantized activations are carried forwarded to the next layer. However, in the backward pass, the gradients from the next layer are propagated back without any further effect of quantization and used to update the floating-point weights and biases used at 312 for the float model. At 314, the clipping values of PACT2 are updated in the forward pass by range estimation and EMA. In this example, the forward pass is indicated by solid lines, such as indicated at 321, while the backward pass is indicated by dashed lines, such as indicated at 322.

An example inference model is modified by replacing activations, such as ReLU, with PACT2 (unsigned) activations. PACT2 (signed) activations are also inserted in other places where activations need to be constrained. For example, convolution, BatchNormalization layers that do not have a ReLU after them, after element-wise addition, concatenation layers, etc.

At 310, trained quantization involves estimating the clipping values and scale values for activations, weights, and biases. These clipping values are not learned by back-propagation, but are estimated as explained hereinabove. The estimation of these values goes on as the training progresses. However, the weights and biases themselves are learned using back-propagation. FakeQuantization operations are used to find quantized equivalent of activations and use these in the forward pass. At 311, STE is used in the backward pass for computing un-quantized gradients and modifying the floating-point weights and bias parameters. However, these gradients themselves are computed using the quantized activations. The original weights remain in floating-point and are not quantized, which is the crux of STE. STE is described in more detail in [6][7][8], for example. At 310, the convolution (from 312) and BatchNorm (from 313) weights and biases are merged before weight quantization at 302.

Creating the kind of data and gradient flow required for STE requires some effort during the training. Modern deep learning frameworks such as PyTorch[13] have flexibility in controlling gradient flow and these features are used in the present example. PyTorch allows certain operations to be selectively put in a torch.no_grad( ) mode that does not record the gradients. In this example, both the quantized and float versions of the activations is computed and at the output of PACT2, the float output is replaced with the quantized output (which will then be propagated to the next layer). But since the replacing is under torch.no_grad( ), the backward pass will ignore the quantized modules and the gradients will flow back through the float operations.

At the end of the training, the model exported has the trained parameters. It also has the clip values estimated by PACT2. The model is typically exported as an ONNX file, but other formats can also be used. A quantization scheme defined herein that needs the clip values and does not need other parameters such as scale values; therefore, it can be exported using existing formats; i.e. existing formats used for exporting a floating-point model can be used to export described examples of a fixed point model.

EXPERIMENTS AND RESULTS

The quantized calibration for post training quantization techniques has a few variants. This is because different inference engines and devices in which they run vary in capability and incorporating some of the quantization variants sometimes give an improvement in accuracy depending on the capability of the device. One good example is the advanced DW (depth wise) calibration described below, in which using separate scale factors for each channel in the depth wise convolution layers give a significant boost to accuracy. Experiments were performed using the following calibration techniques: simple calibration, advanced calibration, advanced DW calibration, and advanced per-channel calibration.

In simple calibration, activation clip values are found by simple min/max instead of histogram-based clipping. EMA is used to average across iterations. Other aspects such as weight clipping and bias calibration are not used.

Advanced calibration uses histogram clipping and EMA to find the activation clipping values. Also uses weight clipping and bias calibration to find better parameters for the model.

Advanced DW calibration is similar to advanced calibration; however, in addition to the depth wise convolution layers, the weights use separate quantization scale factors per channel. This difference in weight sale factors are compensated for at the output and the output activation still has per-layer quantization.

Advanced per-channel calibration is also similar to advanced DW calibration, but in all convolution layers the weights can choose a separate scale factor for each output channel independent of the others. This difference in weight sale factors is compensated for at the output and the output activation still has per-layer quantization.

Table 1 compares the accuracy of various quantization schemes applied on models trained on the ImageNet dataset. The MobileNetV2 models were chosen because MobileNet models are known to have issues with quantization. As seen in the tables, the advanced calibration scheme provides reasonable accuracy for most of the models tested. Per-channel quantization consistently improves the accuracy of advanced calibration. However, in the ImageNet MobileNetV2(TorchVision) example case advanced per-channel quantization was not able to improve accuracy significantly (69.46% vs 71.89%, a 3.5% degradation with respect to floating point); however, quantization aware training helped to reach higher accuracy of 70.55%, a degradation of only 1.34% from floating point.

TABLE 1

Quantization results for ImageNet classification models

| Mode Name | Backbone | Float Acc % | Simple Calib Acc % | Advanced Calib Acc % | Advanced DW Calib Acc % | Advanced Per-Chan Calib Acc % | Quant Aware Training Acc % |
|---|---|---|---|---|---|---|---|
| ResNet50(TorchVision) | ResNet50 | 76.15 | 75.56 | 75.56 | 75.56 | 75.39 | |
| MobileNetV2(TorchVision) | MobileNetV2 | 71.89 | 67.77 | 68.39 | 69.34 | 69.46 | 70.55 |
| MobileNetV2(Shicai) | MobileNetV2 | 71.44 | 45.60 | 68.81 | 70.65 | 70.75 | |

Table 2 compares the accuracy of various quantization schemes for semantic segmentation task. The model used is a variant of the DeepLabV3+[12] with MobileNetV2 feature extractor. The model was trained on Cityscapes dataset with 768×384 image resolution, but the output is up sampled and the accuracy is measured on the native resolution of the dataset, i.e. 2048×1024. In this case, post training quantization with advanced calibration produced good accuracy (with accuracy degrading of 1.18% from floating point). The quantization aware training scheme is kept as simple as possible by not using separate weight scale factors for each channel which is the reason why it is behind in accuracy compared to some of the calibration schemes for semantic segmentation. So each of these methods have their value and one of these can be chosen, depending on the model being used.

TABLE 2

Quantization results for a Semantic Segmentation classification model

| Mode Name | Backbone | Float Acc % | Simple Calib Acc % | Advanced Calib Acc % | Advanced DW Calib Acc % | Advanced Per-Chan Calib Acc % | Quant Aware Training Acc % |
|---|---|---|---|---|---|---|---|
| DeepLabV3Lite | MobileNetV2 | 69.13 | 61.71 | 67.95 | 68.47 | 68.56 | 68.26 |

Figure 4:
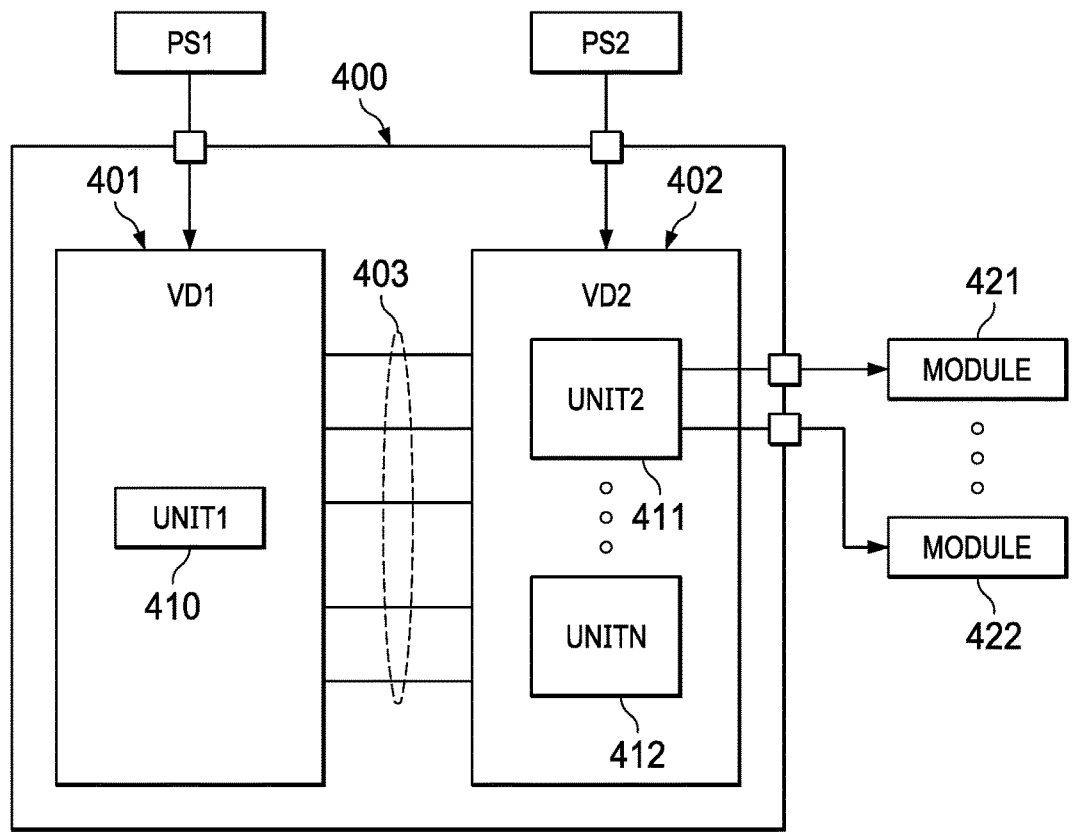
FIGS. 4 and 5 are a block diagrams of an example SoC that is configured to perform deep learning using a CNN executed by one or more processors within the SoC.

FIG. 4 is a block diagram of an example SoC 400 that is configured to perform deep learning using a CNN executed within SoC 400. SoC 400 is a simplified example of an SoC designed for advanced driver assistance systems (ADAS) for automotive applications. In particular, the example SoC 400 is an embodiment of the TDA4VM SoC available from Texas Instruments, Inc. A high-level description of the components of the SoC 800 is provided herein. More detailed descriptions of example components may be found in "TDA4VM Jacinto™ Automotive Processors for ADAS and Autonomous Vehicles Silicon Revision 1.0," Texas Instruments, SPRSP36E, February, 2019, revised December, 2019, pp. 1-311, which is incorporated by reference herein.

Figure 5:
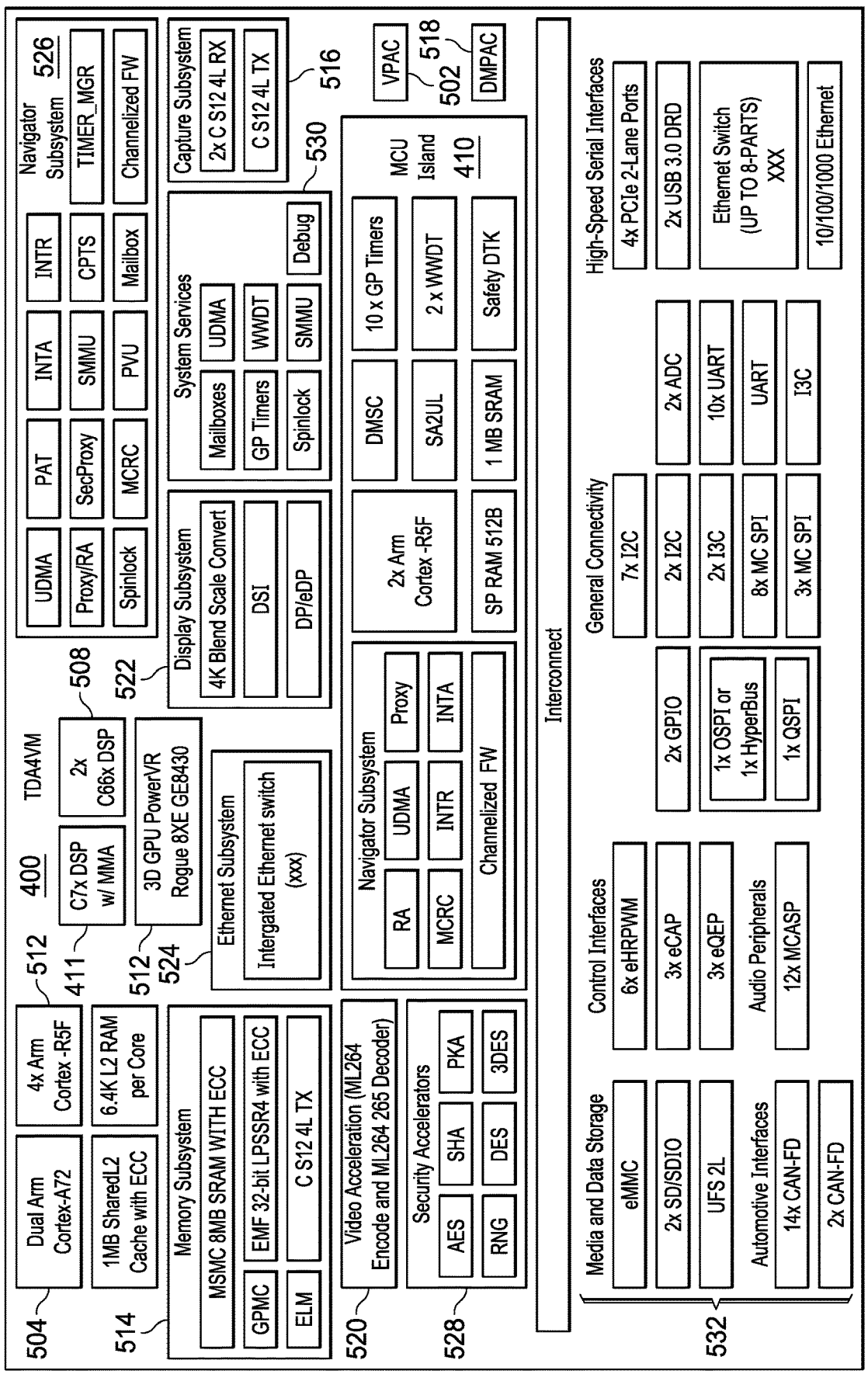

SoC 400 includes separate voltage domains 401, 402 to allow MCU island 410 to operate independently of other processing logic on SoC 400. Various types of processing units described in more detail in FIG. 5 are represented by processing units 411, 412. One or more high speed data buses 403 interconnect processing resources located in different voltage domains. Various sensor modules 421, 422 are coupled to SoC 400 to provide data such as video, radar, infrared, etc. image data to be processed by CNNs being processed by processing units 411, 412 within SoC 400 using PACT2 activation functions as described hereinabove to create 8-bit data for fast processing of the CNNs.

Various processing cores within SoC 400, such as processing unit2 411, can access computer readable media (random access memory, flash memory, etc.) that store software instructions that may be executed by processing core 411 to perform the PACT2 activation function described hereinabove in more detail. 8-bit fixed point multiplication operations are performed by a matrix multiply accelerator (MMA) included with processing unit 411 capable of up to 8 TOPS (tera operations per second) (8 bit) at 1.0 GHz.

FIG. 5 is a more detailed block diagram of an example multiprocessor SoC 400 that may be configured to perform embodiments of a CNN using the PACT2 activation functions described in more detail hereinabove. The TDA4VM provides high performance compute for both traditional and deep learning algorithms with a high level of system integration to enable scalability and lower costs for advanced automotive platforms supporting multiple sensor modalities in centralized ECUs (engine control unit) or stand-alone sensors. The SoC 400 includes numerous subsystems across different voltage domains such as one dual-core 64-bit Arm® Cortex®-A72 microprocessor subsystem 504, a microcontroller unit (MCU) island 410, based on two dual-core Arm® Cortex®-R5F MCUs, four additional dual-core Arm® Cortex®-R5F MCUs 512 in the main domain, two C66x floating point digital signal processors (DSPs) 508, one C71x floating point, vector DSP 411, that includes a dedicated deep learning matrix multiply accelerator (MMA) capable of up to 8 TOPS (8b) at 1.0 GHz, and 3D graphics processing unit (GPU) 512. The SoC 400 further includes a memory subsystem 514 including up to 8 MB of on-chip static random access memory (SRAM), an internal DMA engine, a general purpose memory controller (GPMC), and an external memory interface (EMIF) module (EMIF). In addition, the SoC 400 includes a capture subsystem 516 with two camera streaming interfaces, a vision processing accelerator (VPAC) 502 including one or more image signal processors (ISPs), a depth and motion processing accelerator (DMPAC) 518, and a video acceleration module 520. The SoC 400 also includes a display subsystem 522, an ethernet subsystem 524, a navigator subsystem 526, various security accelerators 528, support for system services 530, and a variety of other interfaces 532.

Software instructions implementing a PACT2 activation function that generates fixed point data for use in a CNN as described herein may be stored in the memory subsystem 514 (e.g., a computer readable medium) and may execute on one or more programmable processors of the SOC 400, e.g., the DSP 411.

Figure 6:
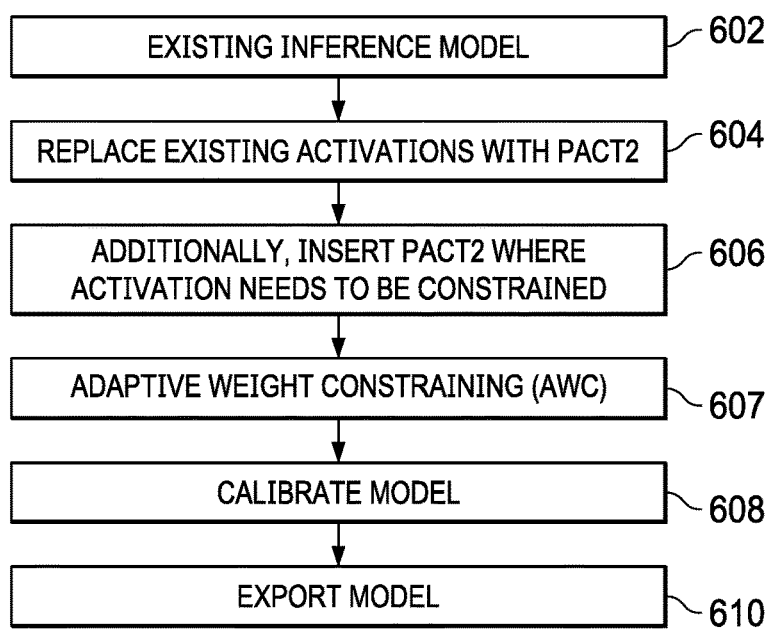
FIG. 6 illustrates model analysis and surgery using PACT2.

FIG. 6 illustrates model analysis and surgery using PACT2. At 602, an existing example floating-point inference model is selected.

At 604, the existing example inference model is modified by replacing activations, such as ReLU, with PACT2 (unsigned) activations to form a quantized inference model. This modification may be done automatically without needing user interaction. At 606, PACT2 (signed) activations are also inserted in other places where activations need to be constrained. For example, convolution, BatchNormalization layers that do not have a ReLU after them, after element-wise addition, concatenation layers, etc. These modifications may be done automatically without needing user interaction.

At 607, Adaptive Weight Constraining (AWC) is performed to constrain and make the weights suitable for quantization. As described in more detail above, sometimes the merged weights of a layer have too large a range and are not suitable for quantization. In that case, calibration cannot solve a resulting accuracy issue.

At 608, calibration of the modified example inference model is performed as described in more detail hereinabove with regards to FIG. 2 and FIG. 3. Calibration may be done using a post training quantization technique or a quantization aware training technique.

At 610, the calibrated quantized inference model is exported. The PACT2 activation function becomes a clip layer when it is exported and saved (for example, into ONNX format). The quantization process described herein is defined such that clip layers are sufficient to do quantization. No other extra side information such as scale factors are required. This is made possible by clearly defining the quantization process (once the clip values are obtained), such that there is no ambiguity. Thus, the quantization technique described herein allows an existing floating-point model format to be easily modified to store a quantized inference model.

Thus, methods for post training quantization as well as quantization aware training that are suitable for symmetric, power-of-2, per-layer quantization have been described. A power-of-2 activation method called PACT2 is described that can estimate the clipping ranges for power-of-2 quantization. The post training quantization method can provide reasonable quantization accuracy for most of the models. In rare scenarios where it has more than expected accuracy drop, the trained quantization method is able to improve the accuracy.

PACT2 activation function selects activation ranges that are suitable for quantization. The PACT2 activation functions work well under the constraints of power-of-2 quantization. It can be incorporated into any CNN model and the model can be trained just like any other CNN model.

There are signed and unsigned versions of PACT2. Thus, PACT2 can be inserted even in places where there is no ReLU activations. This helps to constrain the activation ranges even in places where ReLU activation is not used.

When exported into a deployment model format such as ONNX, the PACT2 activations will provide clip values for the activation to be clipped. If PACT2 is inserted in all places where activation need to be constrained, then no further information needs to be provided in the ONNX model to quantize the model with high accuracy.

In described examples, PACT2 provides a way of generating a pre-calibrated model. The CNN parameters can be adjusted during the calibration process to achieve the best quantization accuracy. No further calibration is necessary in the embedded platform inference model. This ensures good accuracy during inference in the embedded device.

The same quantization method can also be extended to quantization aware training as well and provides even higher accuracy.

OTHER EMBODIMENTS

In described examples, an SoC optimized for automotive ADAS is described. In other examples, different types of SoC may be used to execute CNNs or other types of neural networks in which a PACT2 activation function allows fast processing using fixed point operations in place of floating-point computations.

In described examples, a power-of-2 activation function is referred to as "PACT2". In other examples, a similar power-of-2 activation function may be referred to by a different name.

In described examples, 8-bit fixed point operations are described. In another example, a larger or a smaller number of bits may be selected for fixed bit computations, such as 6-bit, 10-bit, 16-bit, etc. A higher number of bits improves accuracy, but also may increase cost and power consumption.

In described examples, a histogram tail including 0.01 percentile is discarded. In other examples, a smaller or a larger percentile maybe used for discarding data elements, depending on various aspects such as the size of the set of data in the histogram, accuracy sensitivity, etc.

In described examples, a quantized model is exported to ONNX format. In other examples, other known or later developed formats may receive the exported quantized model.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

REFERENCES

[1] Andreas Geiger and Philip Lenz and Raquel Urtasun, Are we ready for Autonomous Driving? The KITTI Vision Benchmark Suite, CVPR 2012
[2] Cordts, M., Omran, M., Ramos, S., Rehfeld, T., Enzweiler, M., Benenson, R., Franke, U., Roth, S., Schiele, B. The cityscapes dataset for semantic urban scene understanding. In: CVPR. (2016)
[3] Jia Deng, Wei Dong, Richard Socher, Li-Jia Li, Kai Li and Li Fei-Fei, ImageNet A Large-Scale Hierarchical Image Database, CVPR 2009
[4] Olga Russakovsky, Jia Deng, Hao Su, Jonathan Krause, Sanjeev Satheesh, Sean Ma, Zhiheng Huang, Andrej Karpathy, Aditya Khosla. Michael Bernstein, Alexander C Berg, Li Fei-Fei, Imagenet large scale visual recognition challenge, International journal of computer vision, 2015
[5] Jungwook Choi, Zhuo Wang, Swagath Venkataramani, Pierce I-Jen Chuang, Vijayalakshmi Srinivasan, Kailash Gopalakrishnan, PACT: Parameterized Clipping Activation for Quantized Neural Networks, arXiv preprint, arXiv-1805.06085, 2018
[6] Y. Bengio, N Lsonard, and A Courville. Estimating or propagating gradients through stochastic neurons for conditional computation, arXiv preprint arXiv:1308.3432, 2013
[7] Penghang Yin, Jiancheng Lyu, Shuai Zhang, Stanley Osher, Yingyong Qi, Jack Xin, Understanding Straight-Through Estimator in training activation quantized neural nets, ICLR 2019
[8] Sambhav R. Jain, Albert Gural, Michael Wu, Chris H. Dick, Trained quantization thresholds for accurate and efficient fixed-point inference of Deep Learning Neural Network, arXiv preprint, arXiv 1903.08066
[9] Ron Banner, Yury Nahshan, and Daniel Soudry, Post training 4-bit quantization of convolutional networks for rapid-deployment, ArXiv preprint, https.//arxiv.org/abs/1810.0572.3
[10] Alexander Finkelstein, Uri Almog, Mark Grobman, Fighting Quantization Bias With Bias, CVPR 2019
[11] Markus Nagel, Mart van Baalen, Tijmen Blankevoort, Max Welling, Data-Free Quantization Through Weight Equalization and Bias Correction, CVPR 2019
[12] Liang-Chieh Chen: Yukun Zhu, George Papandreou, Florian Schroff. and Hartwig Adam, Encoder-Decoder with Atrous Separable Convolution for Semantic Image Segmentation ECCV 2018
[13] A. Paszke, S. Gross, S. Chintala, G. Chanan, E. Yang, Z. DeVito, Z. Lin, A. Desmaison, L. Amiga, and A. Lerer Automatic differentiation in pytorch. In NIPS-W, 2017

What is claimed is:

1. A method for quantizing data for an inference model, the method comprising:
receiving, by a capture subsystem of a processing circuit, a set of data including at least one image; and
quantizing, using one or more processors of the processing circuit, the set of data using a power-of-2 parametric activation (PACT2) function, the quantizing including:
arranging the set of data as a histogram;
discarding a portion of the data corresponding to a tail of the histogram to form a remaining set of data;
estimating a maximum value from the remaining set of data;
determining a new maximum value using a moving average and at least one historical value of at least one prior remaining set of data;
determining a clipping value by expanding the remaining set of data including the new maximum value to a nearest power of two value; and
quantizing the set of data using the clipping value to form a quantized set of data.

2. The method of claim 1, wherein the set of data is floating-point data and the quantized set of data is fixed-point data.

3. The method of claim 2, further comprising calibrating a parameter of the inference model using the one or more processors, the calibrating comprising:
determining a first output value for the inference model using the set of floating-point data;
determining a second output value for the inference model using the quantized set of data; and
adjusting the parameter to minimize a difference between the first output value and the second output value.

4. The method of claim 3, the calibrating further comprising repeating adjustment of the parameter until the difference between the first output value and the second output value is less than a selected value, or for a fixed number of iterations.

5. The method of claim 2, further comprising modifying a parameter in a layer of the inference model using back-propagation from another layer of the inference model.

6. The method of claim 1, wherein the estimating of the maximum value from the remaining set of data and the determining of the new maximum value using the moving average and the at least one historical value of at least one prior remaining set of data includes:
determining a median value of weights in a layer of the inference model;
determining the maximum value of weights in the layer; and
deriving the new maximum value for the weights in the layer from the median value of the weights in the layer.

7. The method of claim 1, wherein the inference model includes a rectified linear unit (ReLU) activation function, further comprising replacing the ReLU activation function with the PACT2 activation function and inserting PACT2 functions in the inference model to restrict activations ranges.

8. The method of claim 1, further comprising exporting the inference model wherein the PACT2 activation function becomes a clip layer.

9. The method of claim 1, wherein the inference model is for a convolutional neural network.

10. A computer system comprising:
a processor; and
a memory storing software instructions that, when executed by the processor, quantize a set of data including at least one image using a power-of-2 parametric activation (PACT2) function for an inference model, wherein the processor, in executing the instructions, is configured to:
arrange the set of data as a histogram;
discard a portion of the data corresponding to a tail of the histogram of the set of data to form a remaining set of data; estimate a maximum value from the remaining set of data;
determine a new maximum value using a moving average and at least one historical value of at least one prior remaining set of data;
determine a clipping value by expanding the remaining set of data including the new maximum value to a nearest power of two value; and
quantize the set of data using the clipping value to form a quantized set of data.

11. The computer system of claim 10, wherein the set of data is floating-point data and the quantized set of data is fixed-point data.

12. The computer system of claim 11, wherein the memory stores instructions that, when executed by the processor, cause the processor to perform an operation of calibrating a parameter of the inference model, in which the processor is configured to:
determine a first output value for the inference model using the set of floating-point data;
determine a second output value for the inference model using the quantized set of data; and
adjust the parameter to minimize a difference between the first output value and the second output value.

13. The computer system of claim 12, wherein the processor is further configured to repeatedly adjust the parameter until the difference between the first output value and the second output value is less than a selected value, or for a fixed number of iterations.

14. The computer system of claim 12, wherein the processor is further configured to modify a parameter in a layer of the inference model using back-propagation from another layer of the inference model.

15. The computer system of claim 12, wherein the processor is further configured to:
determine a median value of weights in a layer of the inference model;
determine a maximum value of weights in the layer; and
derive a new maximum value for the weights in the layer from the median value of the weights in the layer.

16. The computer system of claim 12, wherein the inference model is for a convolutional neural network.

17. A non-transitory computer readable medium storing instructions that, when executed by one or more processors, perform an operation of quantizing a set of data including one image using a power-of-2 parametric activation (PACT2) function for an inference model, the quantizing comprising:
arranging the set of data as a histogram;
discarding a portion of the data corresponding to a tail of the histogram of the set of data to form a remaining set of data;
estimating a maximum value from the remaining set of data;
determining a new maximum value using a moving average and at least one historical value of at least one prior remaining set of data;
determining a clipping value by expanding the remaining set of data to a nearest power of two value; and
quantizing the set of data using the clipping value to form a quantized set of data.

18. The non-transitory computer readable medium of claim 17, wherein the set of data is floating-point data and the quantized set of data is fixed-point data.

19. The non-transitory computer readable medium of claim 18, further storing instructions that, when executed by one or more processors, perform an operation of calibrating a parameter of the inference model, the calibrating comprising:
determining a first output value for the inference model using the set of floating-point data;
determining a second output value for the inference model using the quantized set of data; and
adjusting the parameter to minimize a difference between the first output value and the second output value.

20. The non-transitory computer readable medium of claim 19, wherein the estimating of the maximum value from the remaining set of data and the determining of the new maximum value using the moving average and the at least one historical value of at least one prior remaining set of data includes:
determining a median value of weights in a layer of the inference model;
determining the maximum value of weights in the layer; and
deriving the new maximum value for the weights in the layer from the median value of the weights in the layer.

* * * * *